(12) United States Patent
Ikeda et al.

(10) Patent No.: US 7,387,046 B2
(45) Date of Patent: Jun. 17, 2008

(54) CABLE PROTECTION AND GUIDE DEVICE

(75) Inventors: Masaaki Ikeda, Osaka (JP); Shoichiro Komiya, Osaka (JP); Takayuki Matsuda, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 702 days.

(21) Appl. No.: 10/958,096

(22) Filed: Oct. 4, 2004

(65) Prior Publication Data
US 2005/0252192 A1 Nov. 17, 2005

(30) Foreign Application Priority Data
Apr. 30, 2004 (JP) .............................. 2004-136041

(51) Int. Cl.
*F16C 1/22* (2006.01)
*F16C 1/26* (2006.01)

(52) U.S. Cl. ....................... 74/502.6; 59/78.1

(58) Field of Classification Search ............... 74/502.6, 74/490.01, 490.02, 490.04; 248/49; 174/138 B; 59/78.1
See application file for complete search history.

(56) References Cited

U.S. PATENT DOCUMENTS

| | | | | |
|---|---|---|---|---|
| 4,658,577 | A * | 4/1987 | Klein | 59/78.1 |
| 5,038,556 | A * | 8/1991 | Moritz et al. | 59/78.1 |
| 5,724,803 | A * | 3/1998 | Pea | 59/78.1 |
| 5,768,882 | A | 6/1998 | Weber et al. | |
| 6,016,844 | A * | 1/2000 | Takahashi et al. | 138/120 |
| 6,029,437 | A * | 2/2000 | Hart | 59/78 |
| 6,688,096 | B2 * | 2/2004 | Wada et al. | 59/78.1 |
| 6,789,383 | B1 * | 9/2004 | Plush et al. | 59/78.1 |
| 6,940,019 | B2 * | 9/2005 | Ikeda et al. | 174/68.3 |
| 7,017,328 | B2 * | 3/2006 | Komiya et al. | 59/78.1 |
| 7,150,206 | B2 * | 12/2006 | Utaki | 74/502.6 |

FOREIGN PATENT DOCUMENTS

| | | |
|---|---|---|
| JP | 02-186146 | 7/1990 |
| JP | 2589014 | 5/1996 |
| JP | 9-512083 | 12/1997 |
| WO | WO 95/28582 | 10/1995 |

* cited by examiner

*Primary Examiner*—Richard W L Ridley
*Assistant Examiner*—Justin Krause
(74) *Attorney, Agent, or Firm*—Woodling, Krost and Rust (57) ABSTRACT

To provide a cable or the like protection and guide device in which even if link frame bodies receive torsion and deflection during a linear movement or a bending movement, a mutual connection can be reliably maintained and a connection and assembly operation for the link frame bodies is easy and a stable molding accuracy and a small cost load on a molding mold can be obtained. In a cable or the like protection and guide device 100 in which a large number of rectangular link frame bodies 110 each comprising a pair of spaced link plates 111, 111, and connecting plates 112, 112 bridged the pair of link plates 111, 111 respectively are articulately connected to each other, when said link frame bodies 110 are connected to each other in a linear state, a link disconnection preventing groove portion 111g engaged with an inner circumferential side edge 111h of the link plate 111 is provided on the both left and right ends 112a, 112a of the connecting plate bridged over the bending inner circumferential side of said link frame body 110, respectively, and when said link frame bodies 110 are connected to each other in a bending state, a link disconnection preventing cutaway portion 111k engaged with an inner circumferential side edge 111h of the link plate 111 is provided on the both left and right ends 112a, 112a of the connecting plate bridged over the bending inner circumferential side of said link frame body 110, respectively.

2 Claims, 7 Drawing Sheets

CABLE PROTECTION AND GUIDE DEVICE

This application claims priority to Japanese Patent Application 2004-136041 filed Apr. 30, 2004.

TECHNICAL FIELD

The present invention relates to a cable or the like protection and guide device, for securely reliably protecting and guiding a flexible cable or the like, such as an electrical cable, a hydraulic hose, a pneumatic hose, an optical fiber cable or the like, used in industry machines such as a machine tool, an electric device, an industrial robot, and a transportation machine or in an opening/closing mechanism of a vehicle door, and in which electricity feeding, fluid feeding and signaling and the like are performed to the moving machines or movable portions of the machines.

BACKGROUND TECHNOLOGY

In such kinds of cable or the like protection and guide devices, link plates in each of which a pair of oppositely spaced link plates were connected by connecting rods are articulately connected to each other in plural numbers by overlapping the link plate ends, and a snap mechanism, which engages the link plate and the connecting rod so that these link plate and connecting rod are not disconnected by torsion or deflection, which is generated during articulate movement has been provided (see for example Patent Reference 1).

This snap mechanism comprises a holder-shaped connecting rod inserting portion protruded inside the link plate and engagement pawls formed on both sides of the ends of the connecting rod. In the snap mechanism after the engagement pawl is pushed into the connecting rod inserting portion to once widen an opening of the connecting rod inserting portion forcibly or to deform the connecting pawl inwardly or these deformations are simultaneously caused to engage a hook formed at the opening to the engagement pawl, the connecting rod is connected to the link plate while holding an end of the connecting rod with the connecting rod inserting portion, so that a pair of spaced link plates are prevented from being excessively spaced away from each other in their width direction and the mutual connection between the link plates are prevented from being disconnected from each other. Thus, the bending movement is smoothly performed.

Patent Reference 1: Specification of Japanese Patent No. 2,589,014 (on page 4, FIG. 2).

PROBLEMS TO BE SOLVED BY THE INVENTION

However, although the snap mechanism adopted in a conventional cable or the like protection and guide device has been adapted to be functioned by engagement pawls each having a special shape formed on both sides of ends of the connecting rod, in a case where such a connecting rod is injection-molded with a synthetic resin, an engagement pawl must be forcibly pulled out from a molding mold. Thus, there were such problems that a molding mold is apt to wear whereby the molding accuracy cannot be made constant, or a molding mold becomes complicated whereby the endurance of the molding mold can be reduced or a large cost load on the molding mold is forced.

Accordingly, the object of the present invention is to solve the above-mentioned problems or to provide a cable or the like protection and guide device in which even if a link frame body receives torsion and deflection during a linear movement or a bending movement, a mutual connection can be reliably maintained and a connection and assembly operation for the link frame bodies is easy and a stable molding accuracy and a small cost load on a molding mold can be obtained.

MEANS FOR SOLVING THE PROBLEMS

To attain the above-mentioned object according to the invention of claim 1, in a cable or the like protection and guide device in which a large number of rectangular link frame bodies each comprising a pair of spaced link plates, and connecting plates bridged over a bending inner circumferential side and a bending outer circumferential side of the pair of link plates respectively are articulately connected to each other by connecting pins and connecting pin holes formed in said link plates and a cable is inserted into a cable accommodating space formed of the continuously formed link frame bodies to guide and protect said cable, when said link frame bodies are connected to each other in a linear state, a link disconnection preventing groove portion engaged with an inner circumferential side edge of the link plate is provided on the both left and right ends of the connecting plate bridged over the bending inner circumferential side of said link frame body, respectively.

Further, the above-mentioned problem is attained by a cable or the like protection and guide device according to the invention of claim 2 in which a large number of rectangular link frame bodies each comprising a pair of spaced link plates, and connecting plates bridged over a bending inner circumferential side and a bending outer circumferential side of the pair of link plates respectively are articulately connected to each other by connecting pins and connecting pin holes formed in said link plates and a cable is inserted into a cable accommodating space formed of the continuously formed link frame bodies to guide and protect said cable, characterized in that when said link frame bodies are connected to each other in a bending state, a link disconnection preventing cutaway portion engaged with an inner circumferential side edge of the link plate is provided on the both left and right ends of the connecting plate bridged over the bending inner circumferential side of said link frame body, respectively.

It is noted that if the link disconnection preventing groove portions and the link disconnection cutaway portions are provided on both left and right sides of a connecting plate bridged over a bending inner circumferential side of the link frame body respectively, the cable or the like protection and guide device of the present invention functions. Thus, left and right pair of link plates forming a rectangular link frame body and connecting plates respectively bridged over the bending inner circumferential side and the bending outer circumferential side of these link plates respectively may be integrally formed, or alternatively after they are molded as the respective separate four members, they may be incorporated into one unit, or alternatively, after a connecting plate bridged over the bending outer circumferential side of the link plate and the remaining members are molded as two members, the two members may be incorporated into one unit.

Further, if the cable or the like protection and guide device of the present invention is used in an embodiment where a linear movement and a bending movement can be performed, it may be used even in a horizontal plane or in a vertical plane.

EFFECTS OF THE INVENTION

Thus, since in the cable or the like protection and guide device of the present invention, a large number of rectangular link frame bodies each comprising a pair of spaced link plates, and connecting plates bridged over a bending inner circumferential side and a bending outer circumferential side of the pair of link plates respectively are articulately connected to each other by connecting pins and connecting pin holes formed in said link plates whereby a cable can be inserted into a cable accommodating space formed of the continuously formed link frame bodies to guide and protect said cable. Additionally, according to the present invention the following peculiar effects can be exerted.

That is, since in the cable or the like protection and guide device, which is the invention of claim 1, a link disconnection preventing groove portion is provided on the both left and right ends of the connecting plate bridged over the bending inner circumferential side of said link frame body respectively, the link disconnection preventing groove portion can be disposed irrespective of an incorporation structure of the link frame bodies and a connection incorporating operation of the link frame bodies becomes easy. Further, since a complicated structure of a molding mold can be avoided, the molding accuracy is stabilized and the cost load on a molding mold is reduced. Additionally, when link frame bodies are connected to each other in a linear state, inner circumferential edges disposed on the left and right sides of the link frame bodies are fitted into and engaged in restricted conditions with link disconnection preventing groove portions provided on the left and right ends of the connecting plate bridged over the bending inner circumferential side of a link frame body to be connected, so that a deformation or displacement, which is apt to occur in the width direction can be forcibly suppressed. Accordingly, even if the link frame bodies receive distortion or deflection during a linear movement, the mutual connection between link frame bodies can be reliably maintained.

Particularly, when the cable or the like protection and guide device, which is the invention of claim 1, is used in a horizontal plane where the longitudinal deflection is apt to occur, to perform a linear movement, or when it is used in a vertical plane in suspended conditions where a connecting pin is apt to be pulled out, to perform a linear movement, since the inner circumferential side edges of the link plate are fitted into link disconnection preventing groove portions in restricted conditions, the connecting pin is difficult to be pulled out and the mutual connection between link frame bodies can be reliably maintained.

That is, since in the cable or the like protection and guide device, which is the invention of claim 2, a link disconnection preventing cutaway portion is provided on the both left and right ends of the connecting plate bridged over the bending inner circumferential side of said link frame body respectively, the link disconnection preventing cutaway portion can be disposed irrespective of an incorporation structure of the link frame bodies and a connection incorporating operation of the link frame bodies becomes easy. Further, since a complicated structure of a molding mold can be avoided, the molding accuracy is stabilized and the cost load on a molding mold is reduced. Additionally, when link frame bodies are connected to each other in a bending state, inner circumferential edges disposed on the left and right sides of the link frame bodies are fitted into and engaged in restricted conditions with link disconnection preventing cutaway portions provided on the left and right ends of the connecting plate bridged over the bending inner circumferential side of a link frame body to be connected, so that a deformation or a displacement, which is apt to occur in the width direction can be forcibly suppressed. Accordingly, even if the link frame bodies receive distortion or deflection during a bending movement, the mutual connection between link frame bodies can be reliably maintained.

Particularly, when the cable or the like protection and guide device, which is the invention of claim 2, is used in a horizontal plane where deflection in the longitudinal direction is apt to occur, to perform a bending movement, or when it is used in a vertical plane in suspended conditions where a connecting pin is apt to be pulled out, to perform a bending movement, since the inner circumferential side edges of the link plate are fitted into link disconnection preventing cutaway portions in restricted conditions, the connecting pin is difficult to be pulled out and the mutual connection between link frame bodies can be reliably maintained.

A better understanding of the drawings will be had when reference is made to the Description Of The Invention and Claims which follow hereinbelow.

DESCRIPTION OF THE INVENTION

Figure 1:
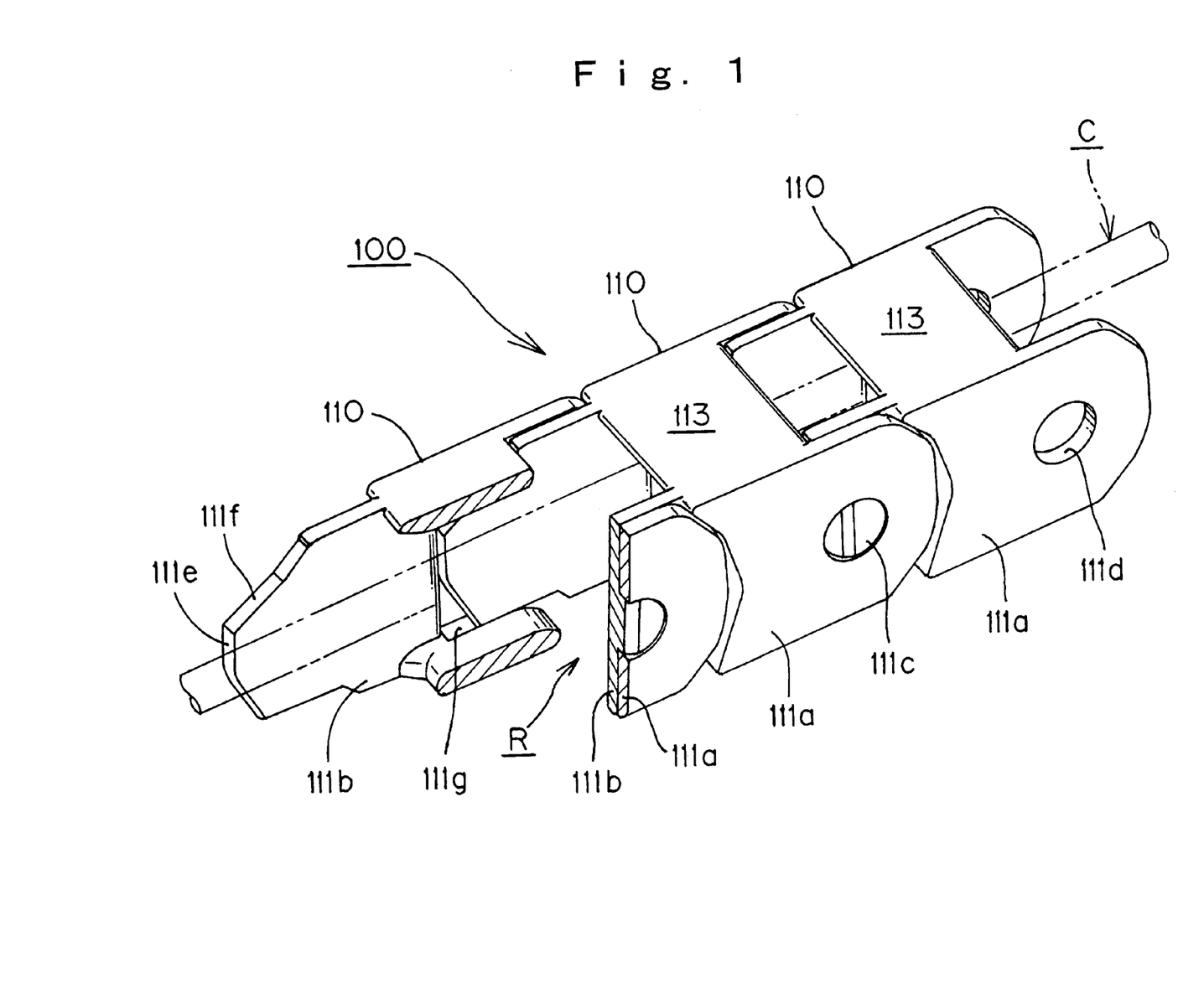
FIG. 1 is a perspective view of a cable or the like protection and guide device, which is one example of the present invention.
Figure 2:
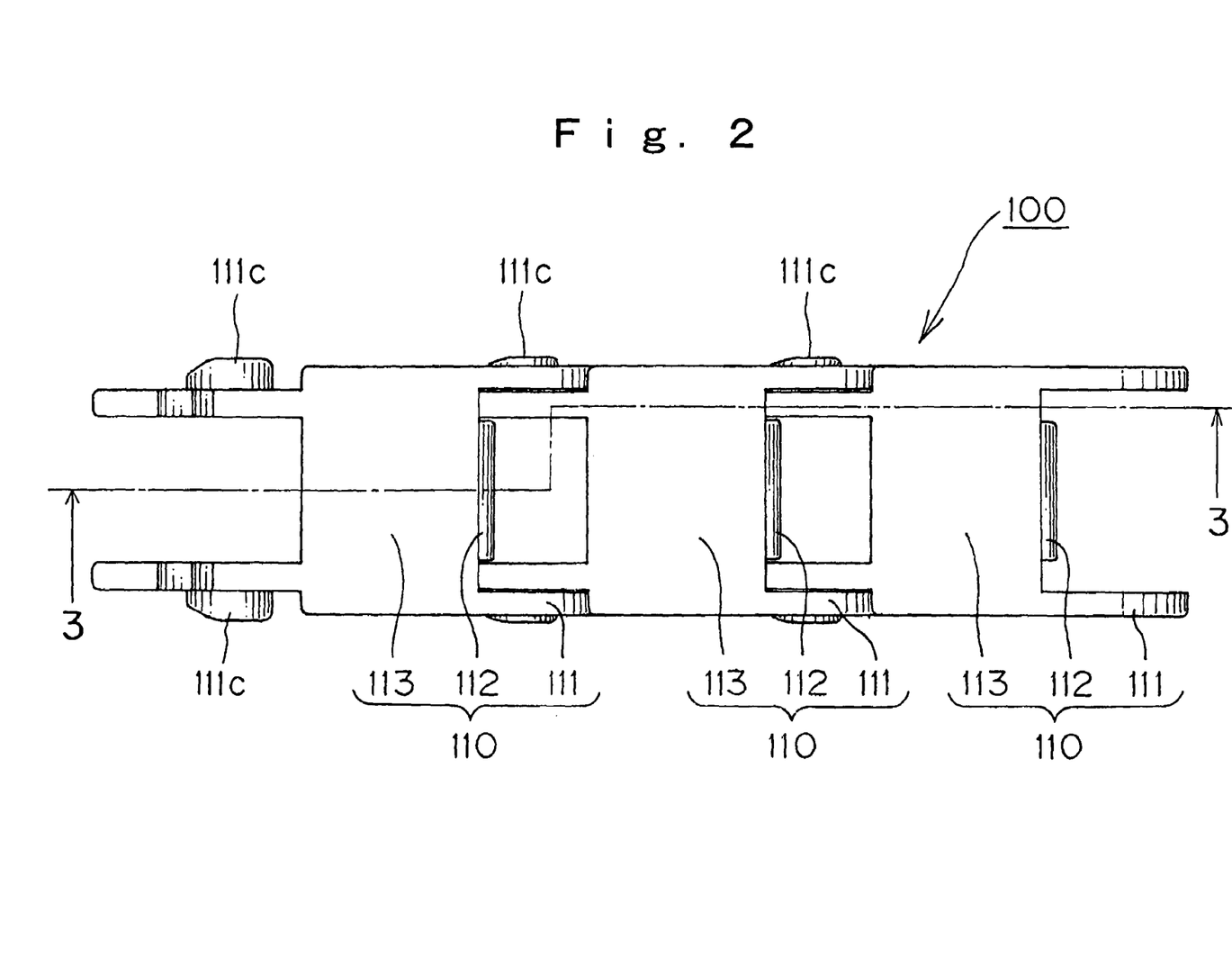
FIG. 2 is a plan view of link frame bodies shown in FIG. 1.
Figure 3:
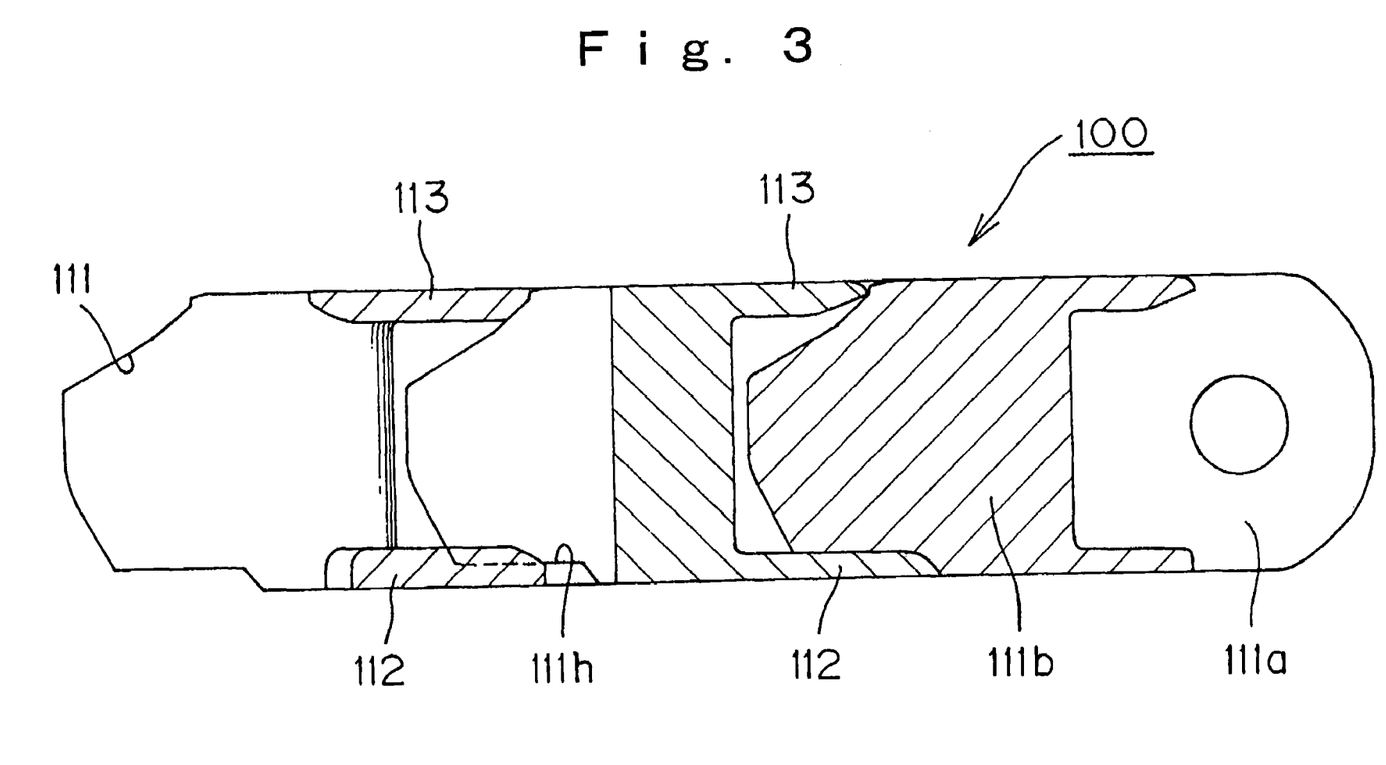
FIG. 3 is a side cross-sectional view taken along the line 3-3 in FIG. 2.
Figure 4:
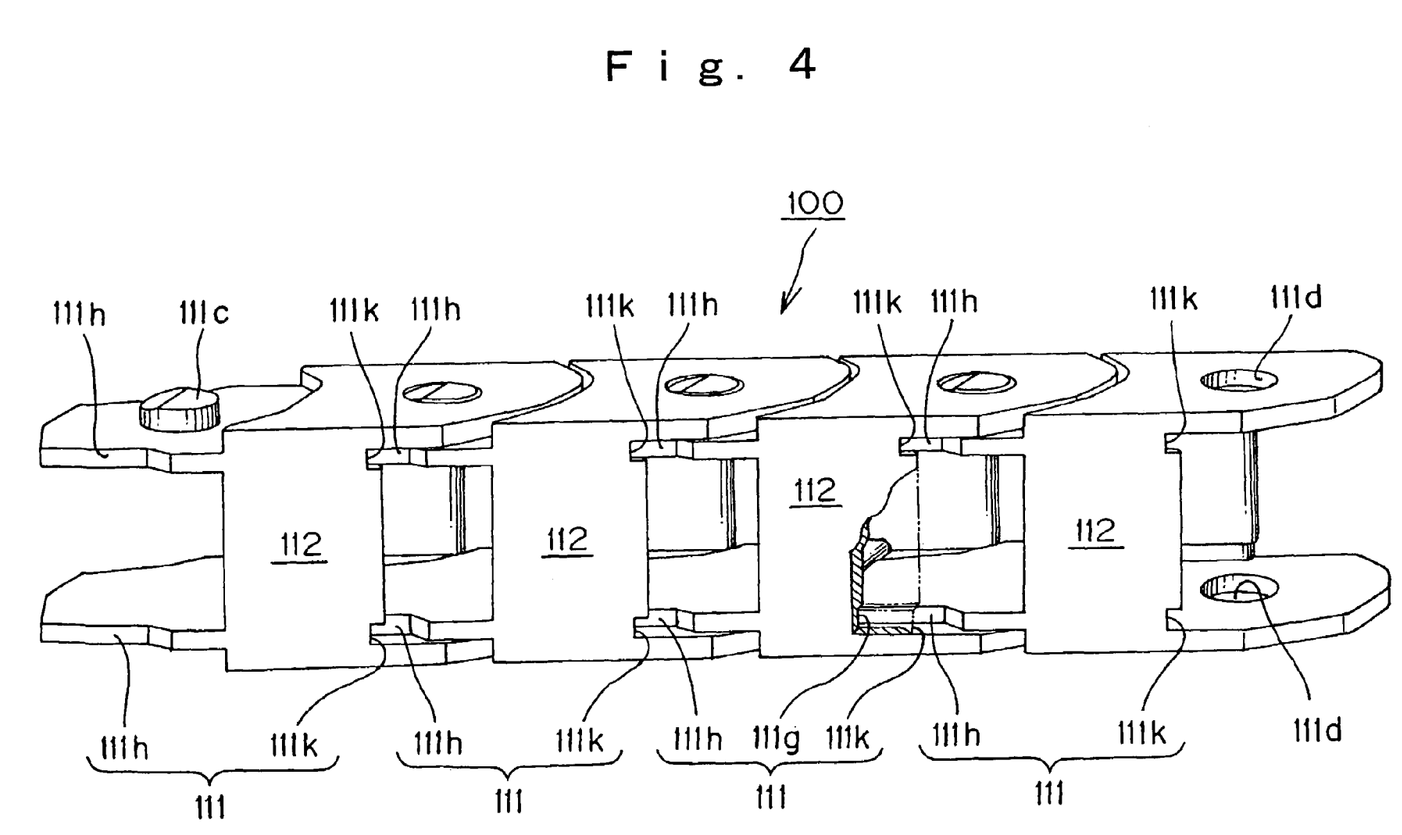
FIG. 4 is a perspective view showing a linear state of the cable or the like protection and guide device viewed from the bending inner circumferential side.
Figure 5:
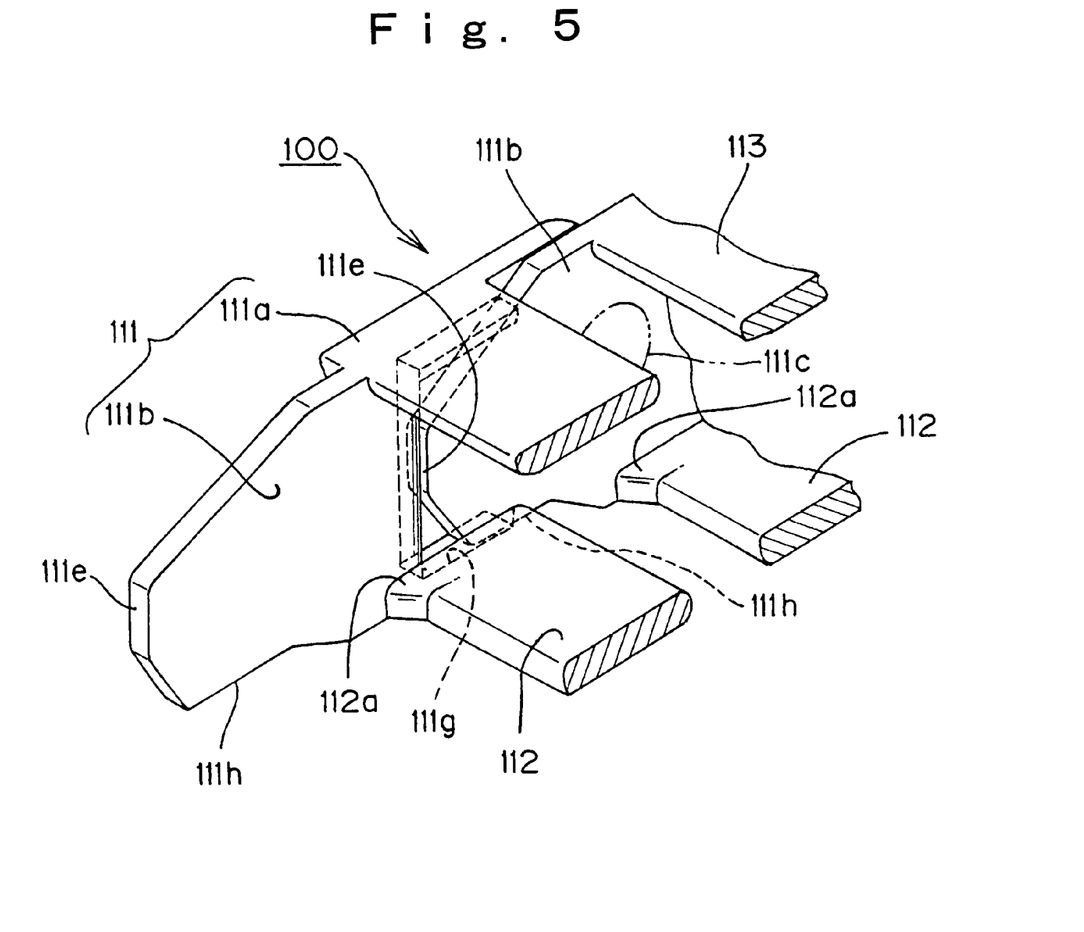
FIG. 5 is a perspective view enlargedly showing the engagement between an inner circumferential side edge of a link plate and a link disconnection preventing groove portion.
Figure 6:
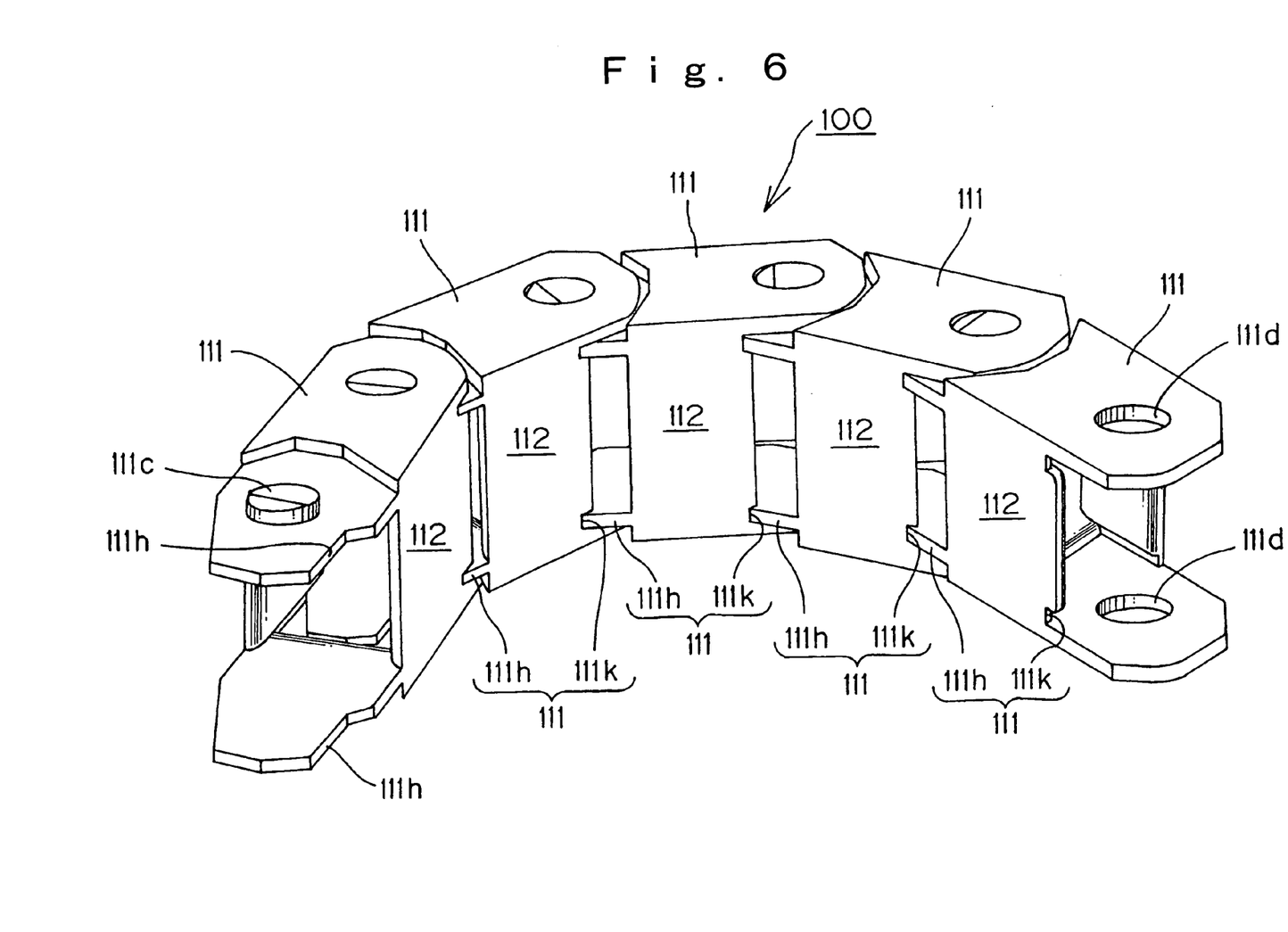
FIG. 6 is a perspective view showing a bending state viewed from the bending inner circumferential side.
Figure 7:
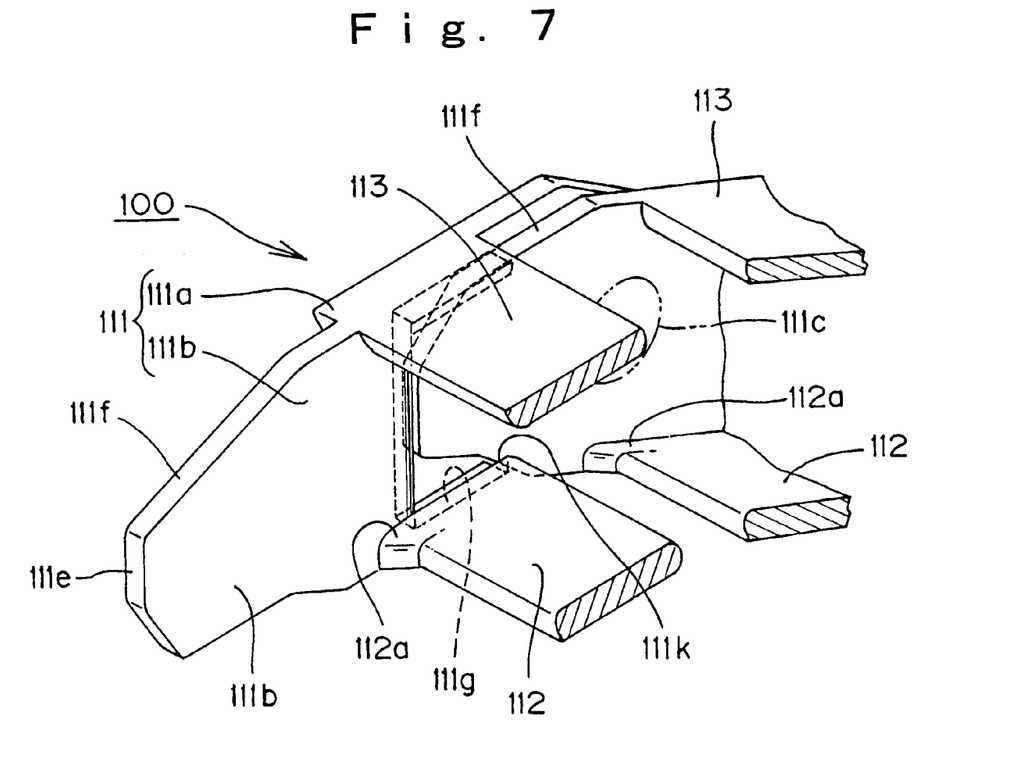
FIG. 7 is a perspective view enlargedly showing the engagement between an inner circumferential side edge of a link plate and a link disconnection preventing cutaway portion.

An example of a cable or the like protection and guide device of the present invention will be described with reference to drawings. Here, FIG. 1 is a perspective view of a cable or the like protection and guide device, which is one example of the present invention, FIG. 2 is a plan view of link frame bodies shown in FIG. 1, FIG. 3 is a side cross-sectional view taken along the line 3-3 in FIG. 2, FIG. 4 is a perspective view showing a linear state of the cable or the like protection and guide device viewed from the bending inner circumferential side, FIG. 5 is a perspective view enlargedly showing the engagement between an inner circumferential side edge of a link plate and a link disconnection preventing groove portion, FIG. 6 is a perspective view showing a bending state viewed from the bending inner circumferential side, and FIG. 7 is a perspective view enlargedly showing the engagement between an inner circumferential side edge of a link plate and a link disconnection preventing cutaway portion.

EXAMPLE

The cable or the like protection and guide device 100 of the present example is used for protecting and guiding a cable or the like such as an electric cable for transmission of electric signals or supplying electric power to connect a movable portion and a stationary portion of a production device of a plasma display and a semiconductor device or a vehicle or the like, or a hose for supplying oil pressure or pneumatic pressure. And in the cable or the like protection and guide device of the present example, rectangular link frame bodies 110 shown in FIG. 1 are connected in large numbers in an elongated shape for connecting the above-mentioned movable portion and stationary portion, so that it can exhibit a linear state or a bending state in accordance with movement conditions between the movable portion and the stationary portion (not shown). As a result a cable C is inserted into a cable accommodating space R continuously formed of these link frame bodies 110, 110 so that it can be protected and guided.

The link frame body 110 is molded of a fluorine resin consisting of a polyvinylidene fluoride resin (PVDF), which can exhibit excellent injection molding workability, and is integrally formed in a rectangular shape by injection molding of a left/right pair of spaced link plates 111, 111 and connecting plates 112, 113 respectively bridged over the bending inner circumferential side and the bending outer circumferential side of the link plates 111, 111.

And the link plate 111 is so-called an offset structure with a step formed in the plate width direction as shown in FIGS. 2 and 3, and has a front side connecting portion 111*a* and a rear side connecting portion 111*b*. These front side connecting portion 111*a* and rear side connecting portion 111*b* are equal in their plate thickness, but a step shifted by the plate thickness is formed between the front side connecting portion 111*a* and rear side connecting portion 111*b*.

Further, the rear side connecting portion 111*b* is provided with a connecting pin 111*c*, and the front side connecting portion 111*a* is provided with a connecting pin hole 111*d*. The connecting pin hole 111*d* has an inner diameter for fitting the connecting pin 111*c* with clearance.

The connecting pin 111*c* provided in the rear side connecting portion 111*b* of the link plate 111 has such a pin length that even if the connected link frame bodies 110, 110 are twisted mutually, the connecting pin 111*c* maintains the fitting into the connecting pin hole 111*d* between both connected link frame bodies 110, 110, that is a pin length in such a degree that after one end of the pin is protruded from an outer surface of the link plate 111, it penetrates through the connecting pin hole 111*d* in connected link frame bodies 110 to project the other end from the opposite outer surface of the link plate, whereby even if a slight deformation occurs between the connecting pin 111*c* of the link frame body 110 and the connecting pin hole 111*d* of the link frame body 110 connected to the former link body 110, the fit state therebetween is sufficiently maintained and is not disconnected.

Further, a reference numeral 111*e* shown in FIG. 7 denotes a connection restricting surface in a linear state, provided on the last end of a rear end connecting portion 111*b*, and which cooperates with an offset front side connecting portion 111*a*, and a reference numeral 111*f* denotes a connection restricting surface in a bending state, provided on the last end of a rear end connecting portion 111*b*, and which cooperates with an offset front side connecting portion 111*a*.

Thus, a concrete embodiment of a connecting plate 112 bridged over the bending inner circumferential side of link plates 111, 111 in the present example will be described in detail.

As shown in FIGS. 1 to 3, both left and right ends 112*a*, 112*a* facing the cable accommodating space R side of the connecting portion 112 are respectively provided with link disconnection preventing groove portions 111*g*, 111*g* slightly wider than the plate thickness along the longitudinal direction of the link plate 111.

Therefore, as shown in FIGS. 4 and 5, when link frame bodies 110, 110 are connected to each other in a linear state, since the inner circumferential edges 111*h*, 111*h* of link plates 111, 111 disposed on left and right sides of a link frame body 110 are respectively fitted to link disconnection preventing groove portions 111*g*, 111*g* of a connecting plate 112 bridged over the bending inner circumferential side of the connected link frame body 110 so that they can be engaged with each other in a restricted state, a deflection and a displacement, which are apt to occur in the width direction can be forcibly suppressed during a linear movement.

Further, as shown in FIGS. 4 and 5, both left and right ends 112*a*, 112*a* of the connecting portion 112 are respectively provided with link disconnection preventing cutaway portions 111*k*, 111*k* cut away in the longitudinal direction of the link plate 111 continued to the above-mentioned link disconnection preventing groove portion 111*g*, 111*g*.

Therefore, as shown in FIGS. 6 and 7, when link frame bodies 110, 110 are connected to each other in a bending state, since the inner circumferential edges 111*h*, 111*h* of link plates 111, 111 disposed on left and right sides of a link frame body 110 are respectively fitted to link disconnection preventing cutaway portions 111*k*, 111*k* of a connecting plate 112 bridged over the bending inner circumferential side of the connected link frame body 110 so that they can be engaged with each other in a restricted state, a deflection and a displacement, which are apt to occur in the width direction can be forcibly suppressed during a bending movement.

As described above, the cable or the like protection and guide device 100 of the present example is incorporated into production devices such as a plasma display, a semiconductor device and the like. Then when the movable portion of the production device is moved, the link frame bodies 110 reaches a linear state or a bending state in accordance with the movement stroke so that the cable C can be guided while being protected.

And in the cable or the like protection and guide device 100 of the present example, the link disconnection preventing groove portion 111*g* and the link disconnection preventing cutaway portion 111*k* are respectively provided at both left and right ends 112*a*, 112*a* of the connecting plate 112 bridged over the bending inner circumferential side irrespective of an assembly structure of the link frame body 110. Thus, since a connection incorporating operation of the link frame bodies becomes easy and a complicated structure of a molding mold can be avoided, the molding accuracy is stabilized and the cost load on a molding mold is reduced. Additionally, when link frame bodies are connected to each other in a linear state, inner circumferential edges 111*h*, 111*h* of the link plates 111, 111 are fitted into and engaged with link disconnection preventing groove portions 111*g*, 111*g* in restricted conditions or when link frame bodies 110 are connected to each other in a bending state, the inner circumferential edges 111*h*, 111*h* of the link plates 111, 111 are fitted into and engaged with link disconnection preventing cutaway portions 111*k*, 111*k* in restricted conditions, so that a deformation or a displacement, which is apt to occur in the width direction can be forcibly suppressed. Accordingly, even if the link frame bodies 110 receive torsion or deflection during a linear movement and a bending movement, the mutual connection between link frame bodies 110 can be reliably maintained. Thus the effects of the present invention are very large.

DESCRIPTION OF REFERENCE NUMERALS

100 . . . Cable or the like protection and guide device
110 . . . Link frame body
111 . . . Link plate
111a . . . Front side connecting portion
111b . . . Rear side connecting portion
111c . . . Connecting pin
111d . . . Connecting pin hole
111e . . . Connection restricting surface
111f . . . Connection restricting surface bending state
111g . . . Link disconnection preventing groove portion
111h . . . Inner circumferential edge
111k . . . Link disconnection preventing cutaway portion
112 . . . Connecting plate bridged over the bending inner circumferential side of link plate 111
112a . . . Left and right ends of connecting plate 112
113 . . . Connecting plate bridged over the bending outer circumferential side of link plate 111
C . . . Cable
R . . . Cable accommodating space The invention has been described by way of Example and those skilled in the art will readily recognize that changes may be made to the invention without departing from the spirit and scope of the appended claims.

The invention claimed is:

1. A cable protection and guide device, comprising:
a plurality of rectangular link frame bodies;
each of said link frame body includes: a pair of spaced link plates and connecting plates;
each of said spaced link plates includes a bending inner circumferential side edge and a bending outer circumferential side edge;
a first connecting plate bridged over said bending inner circumferential side edge of said pair of link plates and a second connecting plate bridged over said bending outer circumferential side edge of said pair of link plates;
connecting pins and connecting pin holes formed in said link plates articulately connect said link frame bodies to each other;
a cable accommodating space formed by the continuously formed link frame bodies to guide and protect said cable;
said link frame bodies are connected to each other in a linear state;
said first connecting plate includes first and second end portions;
said first connecting plate includes first and second grooves in said first and second end portions;
said inner circumferential side edges of said link plates interfit said first and second grooves of said first connecting plate; and, said first and second grooves of said first connecting plate restricts deformation and shifting of said link plates in the width direction.

2. A cable protection and guide device, comprising:
a plurality of rectangular link frame bodies;
each of said link frame body includes: a pair of spaced link plates and connecting plates;
each of said spaced link plates includes a bending inner circumferential side edge and a bending outer circumferential side edge;
a first connecting plate bridged over said bending inner circumferential side edges of said pair of link plates and a second connecting plate bridged over said bending outer circumferential side edges of said pair of link plates;
connecting pins and connecting pin holes formed in said link plates articulately connect said link frame bodies to each other;
a cable accommodating space formed by the continuously formed link frame bodies to guide and protect said cable;
said link frame bodies are connected to each other in a bending state;
said first connecting plate includes first and second ends, each of said ends includes a cutaway portion; and,
said cutaway portions interfit said inner circumferential side edges of said link plates; said cutaway portions restrict the deformation and shifting of said link plate in the width direction.

* * * * *